United States Patent [19]

Burton

[11] Patent Number: 4,719,932

[45] Date of Patent: Jan. 19, 1988

[54] AUTOMATIC VEHICLE WASHING SYSTEM

[75] Inventor: Forrest R. Burton, Green Bay, Wis.

[73] Assignee: PDQ Manufacturing Inc., Green Bay, Wis.

[21] Appl. No.: 736,462

[22] Filed: May 21, 1985

[51] Int. Cl.$^4$ .............................................. B08B 3/02
[52] U.S. Cl. ................................. 134/57 R; 134/123; 134/172
[58] Field of Search ................ 134/45, 123, 172, 181, 134/57 R; 15/DIG. 2; 118/323, 680, 681

[56] References Cited

U.S. PATENT DOCUMENTS

| | | | |
|---|---|---|---|
| 2,321,983 | 6/1943 | Bracket . | |
| 2,900,950 | 8/1959 | Peeps | 118/323 X |
| 3,038,481 | 6/1962 | Brechtel | 134/123 X |
| 3,255,037 | 6/1966 | Knight et al. | 118/323 X |
| 3,279,421 | 10/1966 | Tilney et al. | 118/323 X |
| 3,410,284 | 11/1968 | Burger | 134/45 |
| 3,529,611 | 9/1970 | Daum et al. | 134/123 X |
| 3,533,422 | 10/1970 | Alimanestiano | 134/45 |
| 3,709,190 | 1/1973 | Von Gottberg et al. | 118/323 X |
| 3,724,415 | 4/1973 | Knight | 118/323 X |
| 3,878,812 | 4/1975 | Takeuchi | 118/323 X |
| 4,196,486 | 4/1980 | Capra | 15/DIG. 2 |

FOREIGN PATENT DOCUMENTS 1443146 7/1976 United Kingdom ................. 134/45

OTHER PUBLICATIONS

"Origa Rodless Cylinders", Origa Corporation, Aug. 1981 (12 pages).
"M-Series Amplifiers" Banner Engineering Corp., undated (4 pages).

*Primary Examiner*—Harvey C. Hornsby
*Assistant Examiner*—Frankie L. Stinson
*Attorney, Agent, or Firm*—Willian Brinks Olds Hofer Gilson & Lione Ltd.

[57] ABSTRACT

An automatic vehicle washing apparatus is disclosed. The apparatus comprises a single support column, a boom assembly cantileverly supported on and hinged to pivot horizontally about the support column and mounted to move up and down on the support column. The boom assembly includes a magnetic catch to prevent the boom from pivoting during normal operation. Mounted on the boom are fluid dispensing nozzles and a photoelectric assembly which senses the relative position of the boom assembly and the contour of a vehicle being washed. The photoelectric assembly includes a plurality of pairs of photoelectric emitters and detectors, set such that the beam between each pair is at an angle with both the horizontal plane of vehicle movement and vertical plane containing the ends of the boom assembly. The photoelectric assembly is connected to a control means which controls a drive mechanism to raise and lower the boom assembly.

16 Claims, 12 Drawing Figures

AUTOMATIC VEHICLE WASHING SYSTEM

BACKGROUND OF THE INVENTION

The present invention relates to vehicle washing apparatus, and particularly to automatic vehicle washing apparatus.

Automatic vehicle washing systems are designed to wash automobiles or other vehicles without manual labor. The washing is most generally accomplished by brushes or clothes contacting the surface of the vehicle, or by high pressure jets of water and detergent.

One problem that is encountered in automatic car washes is the cost of the equipment used to do the washing automatically. In the case of brushes and clothes, another problem is that the brushes and clothes get dirty in the washing process and, unless cleaned between uses, scratch the surface of vehicles being washed with the dirt embedded in the brushes or clothes. In the case of high pressure jets, much of the fluid dispensed by the jets is often wasted due to inefficient positioning and excessive distance between the nozzle and the vehicle.

One idea suggested to improve automatic car washes is to have the washing device follow the contour of the vehicle as it passes over the vehicle. Examples of proposed devices using photodetector contour sensing car washing equipment are disclosed in U.S. Pat. Nos. 3,410,284 to Burger and 3,533,422 to Alimanestiano.

In the Alimanestiano device, the washing assembly is supported from the top and moves over the stationary car. Photoelectric emitters and detectors are arranged to transmit and receive four horizontal, parallel beams of light. When the vehicle being washed obscures certain of the beams, a control device cause the vehicle washing device to be raised and stops the horizontal movement of the assembly.

The Burger patent discloses several arrangements of horizontal beams for detecting the contour of a vehicle being washed and control means to raise and lower an overhead supported washing assembly. The Burger patent discloses that when a wash assembly is wide in the horizontal direction of relative movement between the assembly and the vehicle, it is advantageous to provide electric eyes on both sides of the washing device. The result is the equivalent of the four parallel beams of the Alimanestiano device.

Even these proposed contour-following devices have many inadequacies. Primarily they are mechanically complicated, resulting in a large initial expense plus a significant possibility of malfunctioning, with no method of preventing damage to a vehicle in the event of a malfunction. Additionally, the proposed devices, if used in a facility in which vehicles on a conveyor pass a stationary contour-following device, have no way of compensating for the horizontal distance vehicles move while the device makes vertical adjustments, especially where the vehicles move past the device at varying speeds depending on the desires of the facility operator. Also, the proposed devices are quite inadequate in view of the variety of vehicle shapes and sizes in use today, especially when combined with variable conveyor speeds.

SUMMARY OF THE INVENTION

The present invention provides a simple, accurate automatic vehicle washing apparatus. In one aspect the invention comprises a single support column with a boom assembly cantileverly connected to and mounted to move up and down on the support column. In addition, the boom assembly is hinged to allow it to pivot about the support column in a substantially horizontal plane. However, the boom is prevented from pivoting about the support column except in response to contact between the assembly and the vehicle. Means for detecting the position of the vehicle and means to control the mechanism which raises and lowers the boom are also provided to cause the boom to vertically follow the contour of the vehicle during relative horizontal movement between the vehicle and the apparatus.

Another aspect of the invention comprises a boom assembly and means for supporting, raising and lowering the boom assembly. On the boom assembly are mounted fluid dispensing means and a plurality of pairs of photoelectric units. Each pair comprises an emitter and a detector mounted at opposite ends of the boom assembly. The beams of light between each pair, however, are not horizontal. Instead, each beam is at an angle with the generally horizontal plane containing the direction of relative movement between the vehicle and the apparatus. In addition, some or all of the beams may be at an angle with the vertical plane containing the ends of the boom. Control means are provided to raise the boom assembly when a first beam is obscured, to lower it when none of the beams are obscured and to hold it in position when the first beam is not obscured but one or more of the other beams are obscured.

The apparatus of the present invention has several advantages. As to the apparatus itself, the single support column and cantilever wash boom design make it possible to raise and lower the boom with a simple drive mechanism. As a result of the simplicity of the structure, it is relatively inexpensive and free from breakdowns. Also, the cantilever support arrangement makes it possible for the boom to swing out of the way, rather than cause damage, if it contacts a vehicle.

As to the contour sensing aspect of the invention, the arrangement of the photoelectric beams in an angular fashion provides more accuracy than prior art devices in the way in which the boom follows the contour of the vehicle, especially when the vehicles being washed have a variety of sizes and pass through the beams at a variety of speeds. This accuracy produces a better wash, rinse or wax treatment with less fluid, reducing material and energy costs. In addition, this accuracy can be achieved with only two or three photoelectric units, further reducing the complexity and cost of the device.

Further advantages and the invention itself will best be understood in view of the following detailed description of the invention and preferred embodiment.

BRIEF DESCRIPTION OF THE DRAWINGS OF THE PREFERRED EMBODIMENT

DETAILED DESCRIPTION OF THE DRAWINGS AND PREFERRED EMBODIMENT OF THE INVENTION

The automatic vehicle washing system of the present invention is designed to be positioned inside of a building used for washing vehicles. It is also designed to be used as one of a series of devices, each one applying a different treatment (wash, rinse, wax, chemical treatment, etc.) to vehicles passing through the facility on an assembly line basis. Of course the device can be used independently, or modified to apply several different fluids one after another in repeated passes over a vehicle. The term "vehicle washing apparatus", used herein to describe the device, is thus intended to mean an apparatus which applies a fluid on a vehicle without limitation to the nature of the fluid or its relationship with other washing, rinsing or waxing devices.

The preferred embodiment of the invention is designed to be connected with a computer used at a car wash facility which allows for automatic selection of different wash, wax and chemical application packages for different vehicles passing through the facility. Thus some vehicles will not be subjected to the treatment of each one of the vehicle washing devices in the series within the automatic car wash facility. The use of a computer is suggested due to the generally available nature of computers. The functions described herein as being controlled by the computer are relatively simple, for which there are electro-mechnical equivalents well known in the art, such as clock driven controls.

The preferred embodiment of the vehicle washing apparatus of the present invention comprises five major subassemblies; a support column 10, a boom assembly 20, a drive mechanism 30, a photoelectric system 40 and a safety assembly 50. In addition to the mechanical structure, the device also includes pneunamatic and electric control systems and a fluid supply system.

Figure 1:
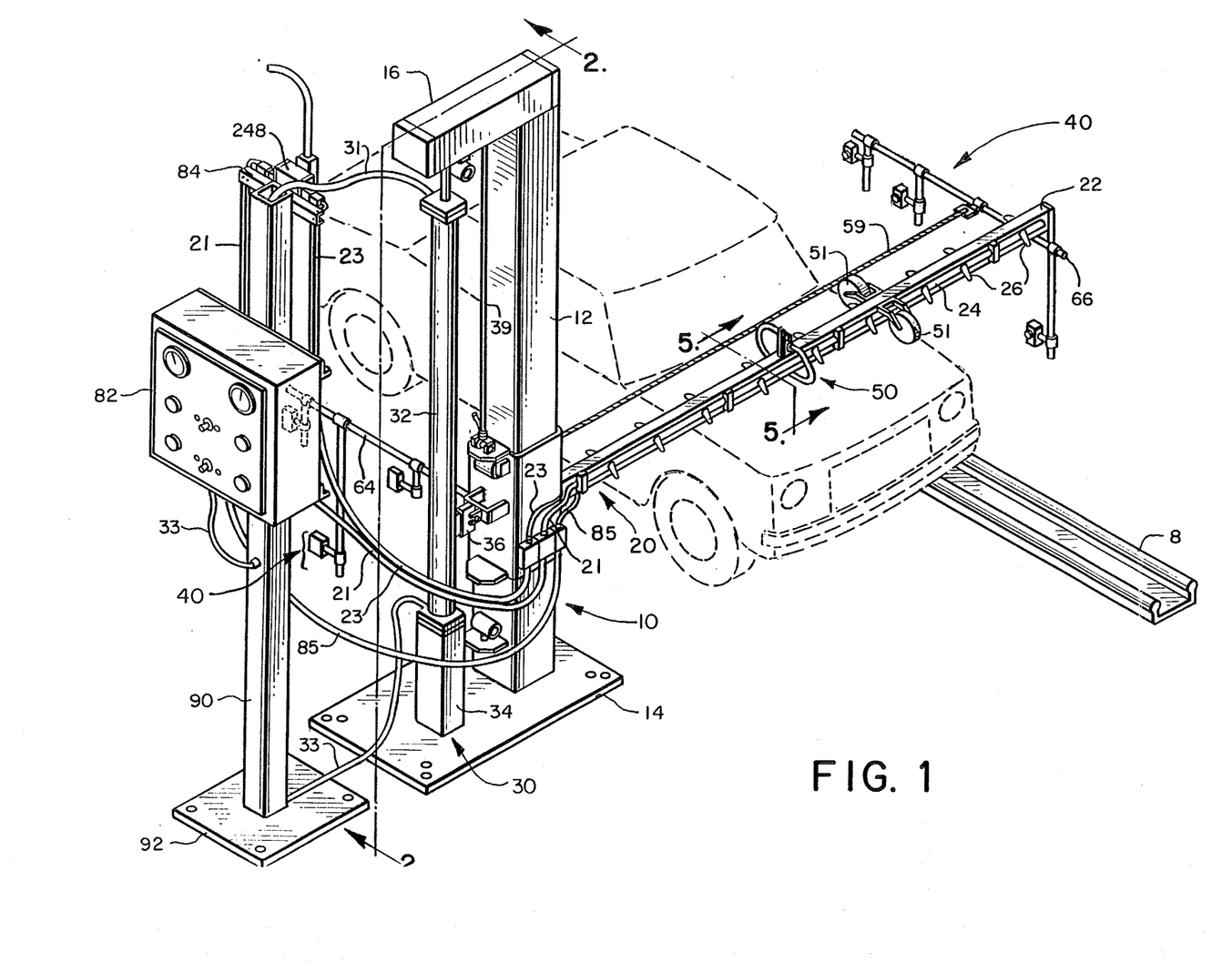
FIG. 1 is a perspective view of the automatic vehicle washing apparatus of the present invention.

As seen in FIG. 1, a vehicle to be washed is positioned under the boom assembly by aligning the driver side wheels in a conveyor guide track 8 positioned on the floor of the building used for washing vehicles. A conveyor is used to move the vehicle through the building past the vehicle washing device of the present invention. The car wash facility computer is used to interconnect controls for the conveyor and the washing apparatus.

Figures 2, 3, 4, 4A:
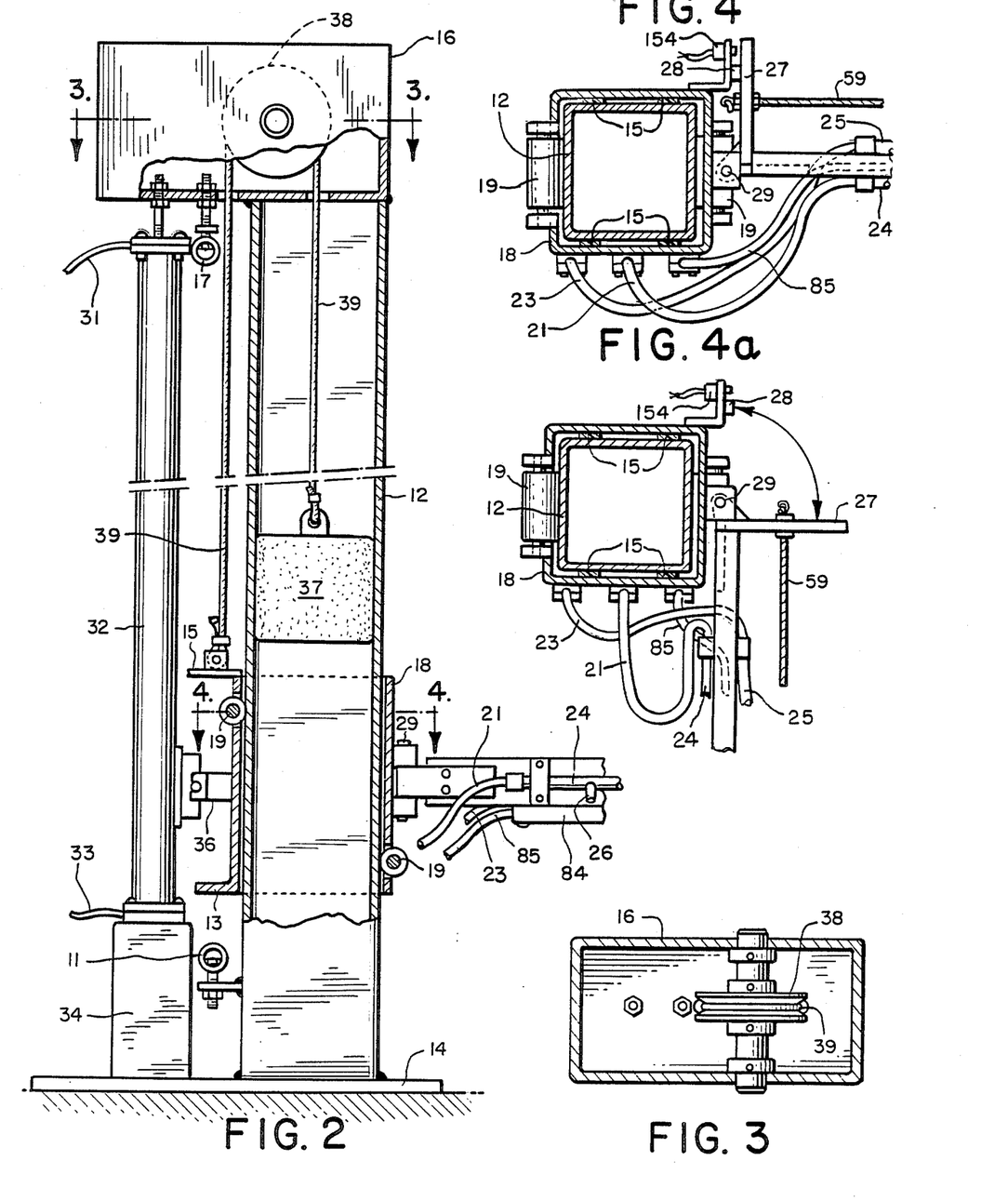
FIG. 2 is a partial sectional view of the support column and drive mechanism taken along line 2—2 of FIG. 1.
FIG. 3 is a top sectional view taken along line 3—3 of FIG. 2.
FIG. 4 is a sectional view taken along line 4—4 of FIG. 2, showing the boom in its normal, operational position relative to the support column.
FIG. 4a shows the structure of FIG. 4 in a position in which the boom has pivoted 90° from the position shown in FIG. 4.

The support column 10 comprises a freestanding, hollow, square column 12 mounted on a base plate 14, best shown in FIGS. 1 and 2. On top of the support column 12 is a housing 16 which is used in part to connect the top of the drive mechanism 30 and associated components to the column 12. A carriage 18 surrounds a portion of the support column 12 and is able to ride up and down on the column 12 by two guide rollers 19 mounted on the carriage 18, one on the bottom front and one on the top back side of the carriage 18. Nylon coasters 15 (FIG. 4) are mounted on the inside of carriage 18 on the sides to provide proper positioning and reduce friction between the carriage 18 and the column 12.

Attached to the front side of carriage 18 is the boom assembly 20 as seen from FIG. 1. The boom assembly includes a rectangular structural member 22 on which two tubes 24 and 25 are mounted, each connected to a plurality of downwardly extending nozzles 26. Half of the nozzles 26 are connected to tube 24 and point in the forward-down direction (relative to the direction of vehicle movement) and the other half of the nozzles 26 are connected to tube 25 and point in the rear downward direction. The two tubes 24 and 25 are connected respectively by suitable flexible conduits 21 and 23 to an actuator value 248 (discussed hereafter), which in turn is connected to a source of fluid under pressure (not shown).

The boom wash assembly 20 with nozzles 26 is positioned so that when a vehicle approaches the device, the nozzles 26 directly in front of the vehicle are activated to spray a controlled pressurized source of fluid on the front of the vehicle. As the vehicle is moving past the automatic vehicle washing apparatus, the boom wash assembly 20 is positioned relative to the contour of the vehicle by the pneumatic drive means 30, controlling by signals from the photoelectric assembly 40, and the same positioned nozzles 26 spray a controlled pressurized source of fluid downward onto the vehicle. When the vehicle reaches a predetermined position on the conveyor, as programmed by the car wash facility computer, the nozzles 26 facing the vehicle as the vehicle is approaching are deactivated and the nozzles 26 on the opposite side of the boom wash assembly 20 are activated.

The boom assembly 20 is supported in a cantilever manner on the carriage 18. In addition, the boom assembly 20 is mounted on a hinge 29 (FIGS. 2 and 4) so that it may pivot in a generally horizontal plane about its point of connection on the carriage 18. Also attached to the carriage 18 is a magnet assembly 28. The boom assembly 20 includes a plate 27, best shown in FIG. 4, which contacts the magnet 2S and holds the boom assembly 20 in the position shown in FIGS. 1 and 4 during operation. In the event that a vehicle strikes a portion of the boom assembly 20, the force generated on the boom 20 causes the magnet assembly 28 to release the plate 27, allowing the boom assembly 20 to swing on hinge 29 out of the direction of the vehicle travel to the position shown in FIG. 4a.

A proximity switch 154 is mounted on the carriage 18 next to the magnet assembly 28. The front of the switch 154 is spaced from ¼ to ½ inch from the plate 27. If the plate 27 moves away from the magnet assembly 28, the proximity switch 154 sends an electric signal to the car wash facility computer to stop the conveyor. Thus, if a system malfunction causes the vehicle to strike the boom 20, the magnet assembly 28 and hinge 29 allow the boom 20 to swing out of the way, and the conveyor will be stopped by a signal from proximity switch 154.

The drive mechanism 30 comprises a rodless pneumatic cylinder 32 mounted on a support stand 34, best shown in FIGS. 1 and 2. The support stand 34 is attached to the base plate 14. The top of the rodless cylinder 32 is connected to the housing 16 on top of the support column 12. The piston inside the rodless pneumatic cylinder 32 is connected to the carriage 18 by a lug 36, which transmits the forces generated in the cylinder 32 to raise and lower the carriage 18 and the pivotally connected boom assembly 20.

Mounted within the housing 16 is a pulley 38 over which is draped a steel cable 39 (FIG. 3). One end of the cable 39 is attached to a counterweight 37 and the other end is attached to the carriage 18. As seen in FIG. 2, the counterweight 37 fits within the hollow support column 12. Thus as the lug 36 moves up and down in response to pneumatic forces in the cylinder 32, the carriage 18 moves up and down on the column 12 and the counterweight 37 moves in the opposite vertical direction inside column 12.

On the back side of the carriage 18 are upper and lower plates 15 and 13. Mounted on the bottom of the column 12 is a shock absorbing bumper 11. A similar bumper 17 is attached to the housing 16. The presently preferred bumpers are cylindrical in shape and formed of heavy, shock absorbing material. These bumpers, by contacting the upper and lower plates 15 and 13 of the carriage 18, limit the distance which the carriage 18 is able to travel up and down on the column 12. They also provide emergency stops if the pneumatic controls fail.

In the preferred embodiment, the photoelectric assembly 40 has a total of three photoelectric emitters and three photoelectric detectors forming three pairs of photoelectric units. One component of each pair is mounted on opposite sides of the vehicle, attached to one of two support structures, 64 and 66. Support structure 64 is mounted on the carriage 18 and support structure 66 is mounted on the far end of the boom assembly 20 (FIG. 1). The elements of each pair are connected to the structures 64 and 66 with collars and set screws which make it easy to adjust and position the elements so that the elements of each pair can be aligned. The three emitters, 41, 45 and 47 (FIGS. 7 and 8), emit modulated electromagnetic radiation, which is detected respectively by detectors 42, 44 and 48. The path between each pair has respectively been designated 43, 46 and 49. It will be noted from looking at the drawings that not all of the detectors are mounted on the same support structure. Detector 44 is mounted on support structure 64, while detectors 42 and 48 are mounted on support structure 66. This positioning helps to eliminate "cross-talk" between the emitter of one pair and the detector of a different pair. The elimination of cross-talk is also achieved by placing detectors on the same support structure at relatively large distances from each other, which is accomplished by crossing beam paths 43 and 49 as shown in FIG. 8.

Figure 7:
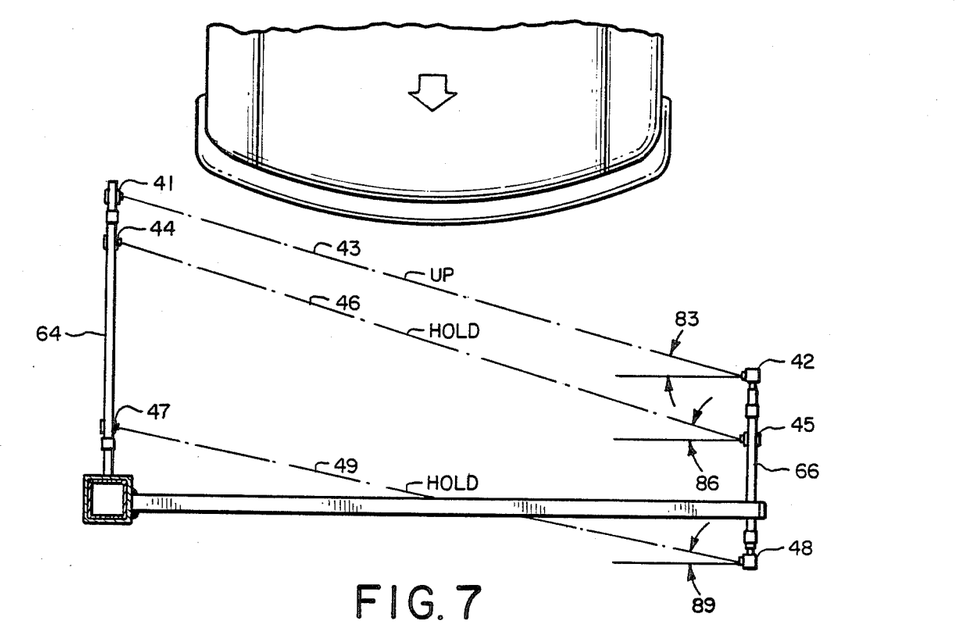
FIG. 7 is a top schematic representation of the beam paths of the apparatus of FIG. 1.
Figure 8:
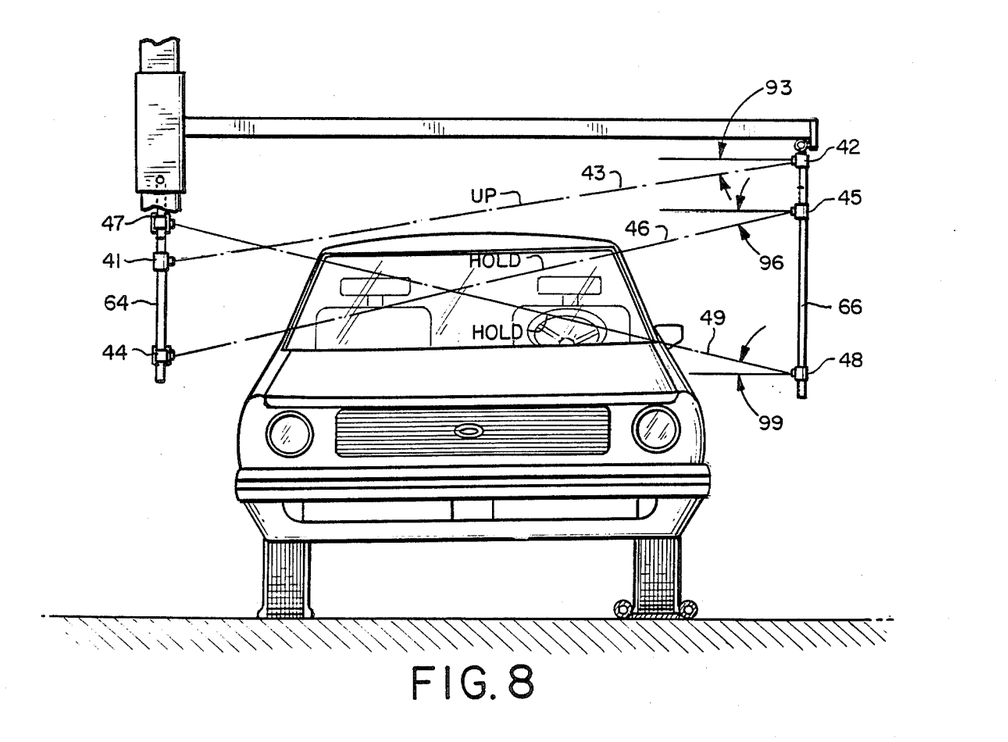
FIG. 8 is a schematic representation of the beam paths of the apparatus of FIG. 1 as seen from the position of viewing an oncoming vehicle.

As seen in FIGS. 7 and 8, beam paths 43, 46 and 49 make respectively angels 83, 86 and 89 with the the vertical plane containing the ends of the boom assembly 20 and angles 93, 96 and 99 with the plane of relative horizontal movement between the vehicle and the washing apparatus. These angles make it possible for the boom assembly 20 to be accurately spaced in relation to the surface of vehicles of a variety of sizes moving under the boom 20 at a variety of speeds.

Figure 5:
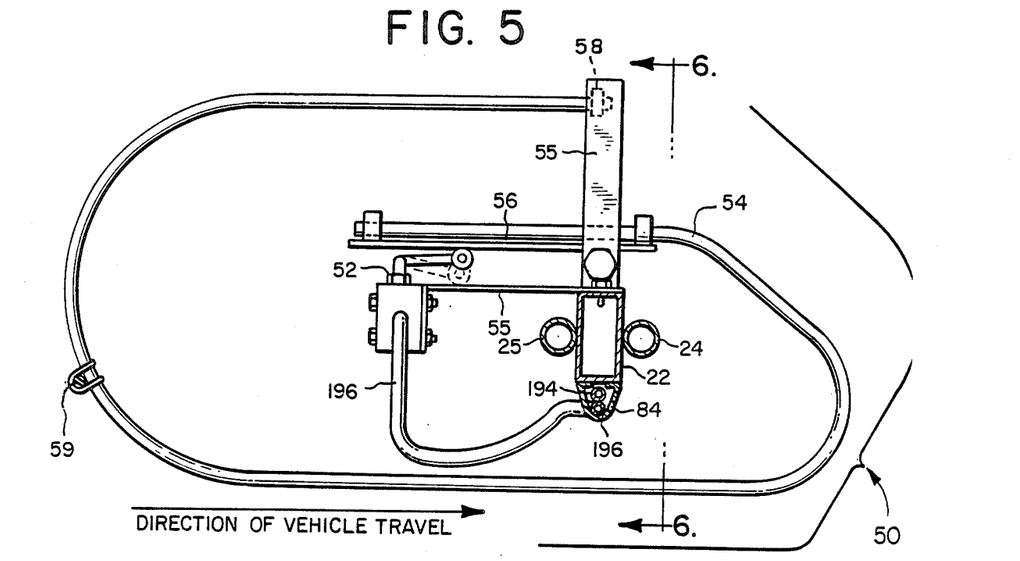
FIG. 5 is a sectional view taken along line 5—5 of FIG. 1.

Also mounted on the boom assembly is a safety mechanism 50, shown in FIGS. 1 and 5. The safety mechanism 50 includes a valve assembly 52, a wand 54 and cable 59. The wand 54 is made from a rigid nylon material formed into the shape depicted in FIG. 5. The valve 52 is mounted on a frame 55 which is attached to the boom structural member 22. At one end the wand 54 is attached by set collars 58 to a plate 56 pivotally connected to frame 55. At the other end, wand 54 is similarly connected to an extension of frame 55. The plate 56 is positioned next to a lever on valve 52. The lever acts as a limit switch, opening the valve 52 if the wand 54 is bumped by a vehicle, allowing air to flow from air supply hose 194 through return hose 196 to a piloted pneumatic valve (designated as 220, FIG. 11 and described more fully hereafter). The shape of wand 54 and the way it is connected to the boom assembly 20 is such that if a vehicle contacts the bottom of the wand 54 or the side of the wand 54 facing an oncoming vehicle, the lever on valve 52 is depressed. The result of contact between the wand 54 and a vehicle is that the pneumatic drive means 30 is activated to quickly raise the boom assembly 20 to avoid any damage to the vehicle being conveyed through the vehicle washing facility.

The cable 59 is stretched across the oncoming vehicle side of the boom assembly 20 between the photodetector support structure 66 and the plate 27. The cable 59 is also attached to the wand 54 by a simple lashing. Should any part of the vehicle being washed contact the cable 59, the cable 59 moves the wand 54, opening valve 52 to quickly raise the boom 20.

Also attached to the boom 20 are two rollers 51, one on each side of the boom. The rollers 51 are designed as a fail-safe device to keep the nozzles 26 and other portions of the boom 20 from damaging the vehicle in the event the boom assembly 20 is accidently lowered while a vehicle is under it. The rollers 51 are made of a rubber material to avoid scratching the vehicle's paint.

Figure 6:
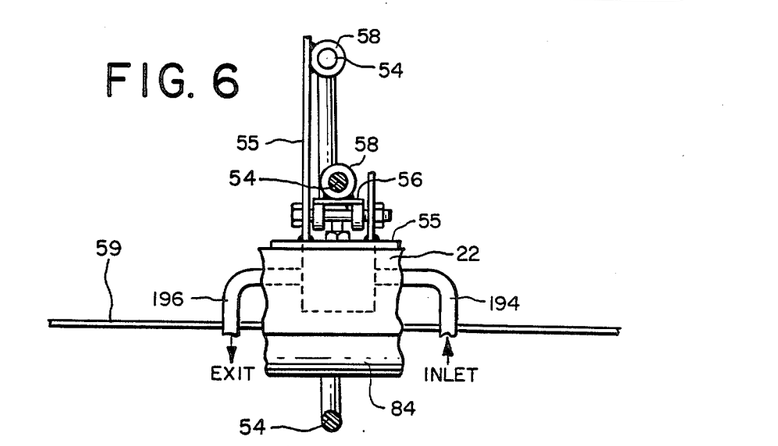
FIG. 6 is a sectional view taken along line 6—6 of FIG. 5.

A control console assembly encompasses all of the controls for the electric and pneumatic functions of the vehicle washing apparatus of the preferred embodiment. The control console assembly consists of a control console 82 positioned on a square column 90 affixed to a base plate 92 (FIG. 1). The control console 82 is usually positioned directly behind the drive mechanism 30 but may be positioned at any convenient location. The base plate 92 is anchored to the floor. A bracket 84 is affixed to the top portion of column 90 as a support for the flexible hoses 21, 23 and 85. Hoses 21 and 23 are attached to an actuator valve 248, mounted on the top of column 90, which controls the flow of fluid to the nozzles 26. Hose 85 serves as a protective covering for the electrical wiring from the photoelectric assembly 40 and proximity switch 154 and the air supply and return hoses 194 and 196. Hose 85 connects at one end to the control console 82 and at its other end to a plastic trough 84 underneath boom structural member 22, which encloses the wires and hoses extending onto the boom 20 (FIGS. 2, 5 and 6).

As shown in FIGS. 1 and 2, hoses 31 and 33 are connected to the inlets at the top and bottom of the rodless cylinder 32 with appropriate fittings and are connected to the control console S2. The control console S2 is connected to the main supply source of electricity and compressed air (not shown).

Figure 11:
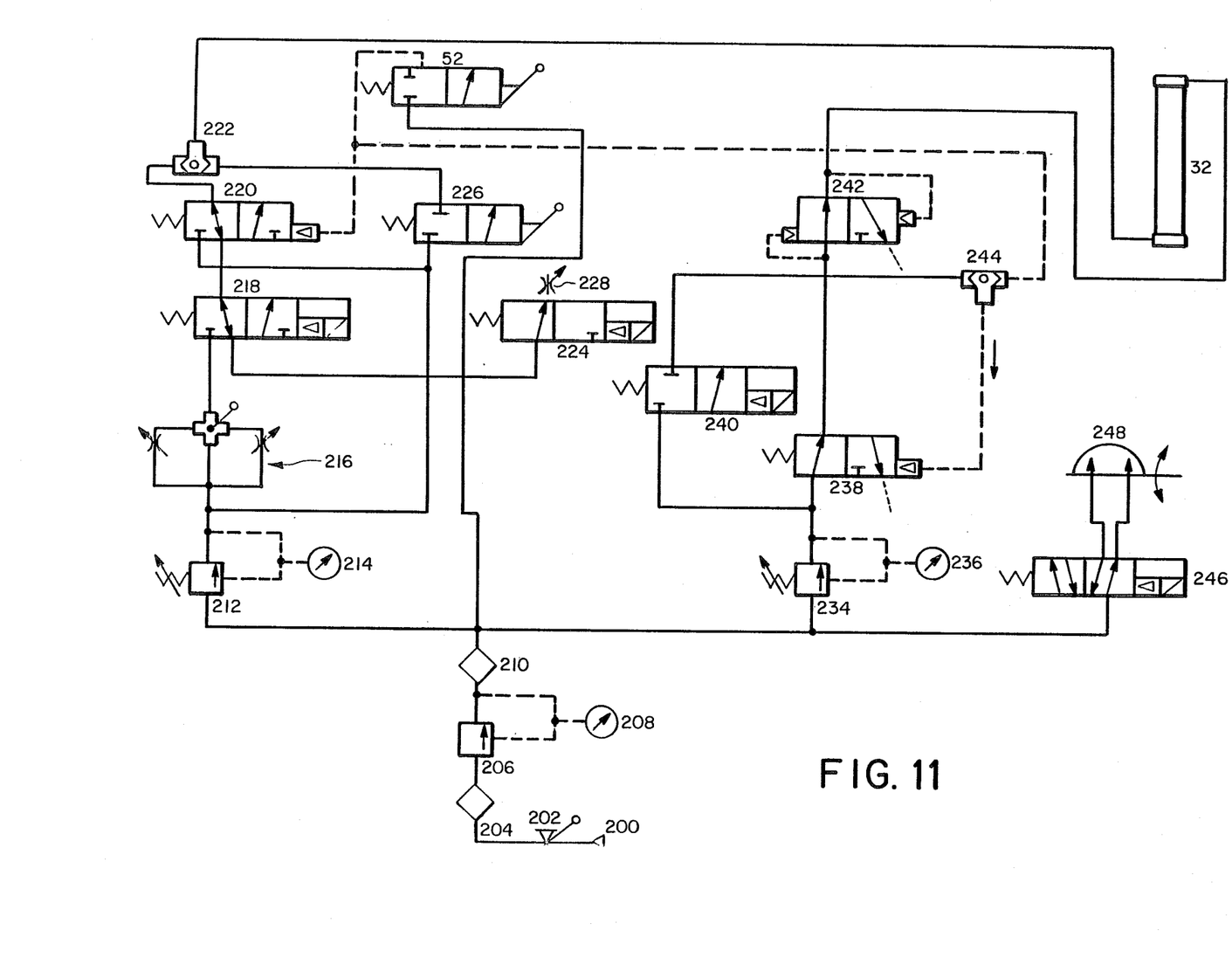
FIG. 11 is a schematic diagram of the pneumatic controls of the apparatus of FIG. 1.

FIG. 11 shows a schematic representation of the pneumatic controls and piping for the vehicle washing apparatus of the present invention. A source of air 200 is connected in line with the shut off valve 202, followed by a filter 204, a pressure regulator 206 and a pressure gauge 208. A fine drain lubricating system 210 is also provided in line before the air is routed to various components in the pneumatic system.

There are four major groups in the pneumatic system. The first is the valving and controls for activating the cylinder 32 in an upward direction. Associated with this "up" group is a valve which holds the pressure in the cylinder 32 static. The second group causes air to flow into the top of the cylinder 32 and allows air to exhaust from the bottom, causing the boom 20 to drop. The third group provides an air supply for the safety valve 52. The fourth group actuates the valve controlling the flow of fluid from either the forward facing or rear facing nozzles 26.

The "up" system comprises an adjustable pressure regulator 212 and pressure gauge 214, a manually operated speed selector 216, an electrically controlled "up" valve 218, a pneumatically controlled "fast up" valve 220, and a shuttle valve 222. The speed selector 216 allows for a manual adjustment to the rate at which the cylinder 32 raises the boom 20. The speed selector 216, however, is seldom changed from its set position once the detector assembly 40 is adjusted to fit the variety of speeds at which vehicles will be passing the apparatus.

From the speed selector 216, air flows to the up valve 218. Valve 218 is controlled electrically so that it is in a normally closed position. When the control system indicates that the boom 20 needs to rise, valve 218 is opened and air is allowed to flow through valve 218 and eventually through shuttle valve 222 to the bottom of the cylinder 32. There is also a manual up valve 226 which is normally closed. Should the boom need to be raised manually (without a signal from the electrical controls), the manual up valve 226 is activated and air is allowed to pass through shuttle valve 222 into the bottom of cylinder 32. When the pneumatically controlled fast up valve 220 receives a pneumatic signal from the safety valve 52 on the boom, air is allowed to pass directly through the fast up valve 220 to the shuttle valve 222 and into the bottom of the cylinder 32.

Because the boom assembly 20 is balanced by the counterweight 37, pneumatic forces are used to move the boom 20 downward. The use of pneumatic down forces, rather than gravity, also allows the rate at which boom 20 descends to be controlled, which is important in matching the action of the device with various conveyor speeds. The parts of the pneumatic system comprising the "down" group include an adjustable pressure regulator 234, a pressure gauge 236, an pneumatically controlled down valve 238, an electrically controlled pilot valve 240, a shuttle valve 244 and a piloted quick exhaust valve 242.

The electrically controlled valve 240 is normally closed. In this position, valve 238 is open to allow pressurized air to flow through valve 242 to the top of the cylinder 32, causing the boom 20 to drop. When the boom 20 is dropping, air from the bottom of the cylinder 32 travels in a reverse "up" direction, back through shuttle valve 222, through valves 220 and 218, to a "hold" valve 224, through which the air normally exhausts through a flow control valve 228.

When valve 224 is closed by a signal to hold the boom 20 in a static condition, this reverse flow is stopped. The same signal from the controls also opens valve 240 and air is allowed to pass to shuttle valve 244, which in turn closes the pneumatically controlled down valve 238, and the boom 20 holds static.

The piloted quick exhaust valve 242 responds to a difference in pressure between the top of the cylinder 32 and the pressure from the down valve 238. Since the pressure in the up system exceeds the pressure in the down system, when up valve 218 opens, pressure builds in the cylinder 32. This causes the exhaust valve 242 to shift, blocking the flow of air from the down system and allowing air from the top of the cylinder 32 to exhaust to the atmosphere, allowing the boom 20 to rise.

The pneumatic safety system comprises the mechanically actuated safety valve 52. When the safety valve 52 is opened, air flows to actuate the pneumatic fast up valve 220, which in turn causes the boom to quickely rise as previously discussed. In addition, air flows to shuttle valve 244 to actuate and close the down valve 238.

The fourth group of pneumatic devices include an electrically controlled valve 246 and a pneumaticly controlled valve or actuator 248. The valve 246 has two positions. In the position shown in FIG. 11, air is allowed to pass to the one side of actuator 248, which in turn regulates the flow of fluid to the rear facing nozzles 26 on the boom assembly 20. Under direction from the computer, valve 246 is shifted to the opposite side from that depicted in FIG. 11, and air flows to the other side of actuator 248, resulting in a change of the flow of fluid to the forward facing nozzles 26.

Figure 10:
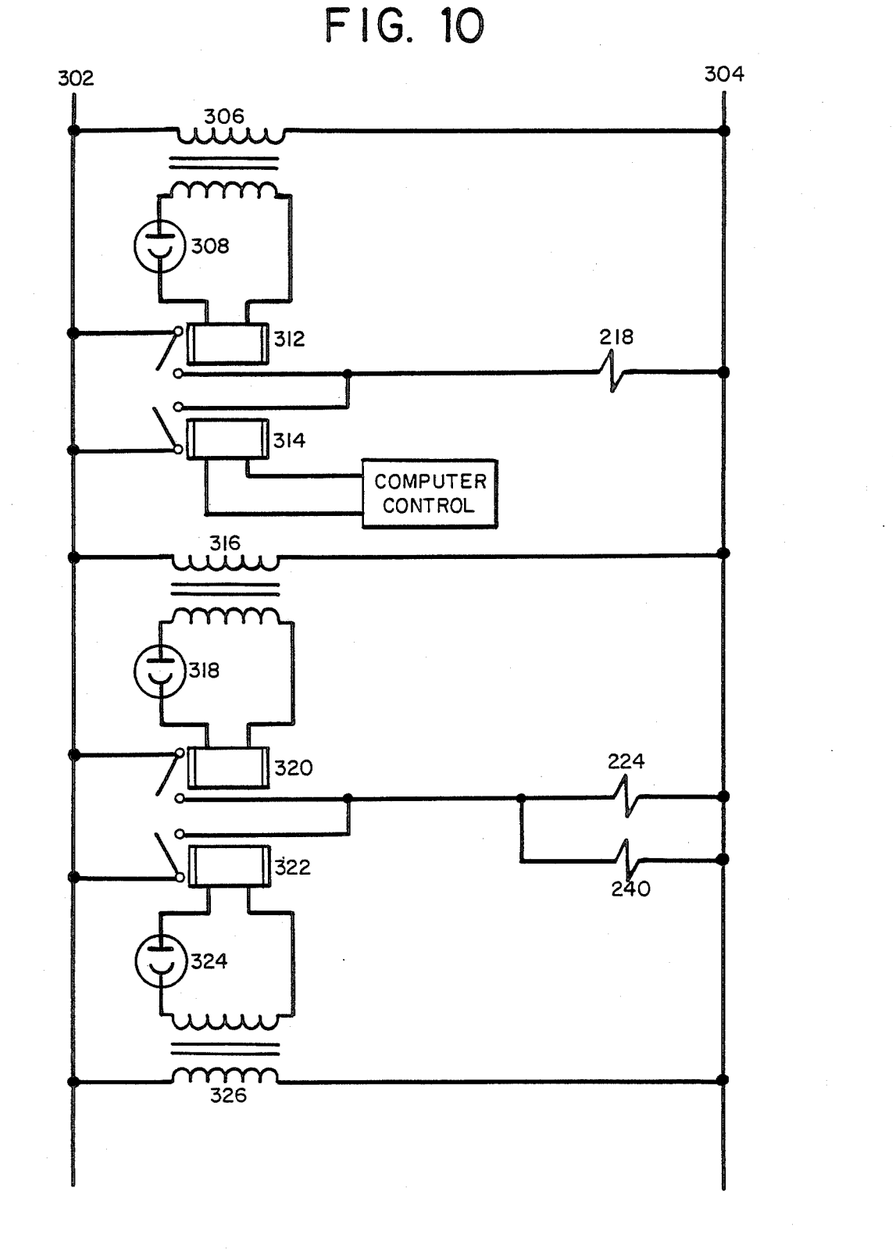
FIG. 10 is a schematic diagram of a part of the electrical controls of the apparatus of FIG. 1.

A schematic illustration of a portion of the control circuitry 300 for the preferred embodiment of the present invention is shown in FIG. 10. Not shown is the routine circuitry between the computer and the conveyor, the proximity switch 154 and the solenoid of valve 246.

The control circuitry 300 includes leads 302 and 304 connected to a suitable source of power. Included in the circuitry are transformers 306, 316 and 326 for supplying current of the desired voltage to the photoelectric units.

The photoelectric unit 308 comprises the emitter 41 and detector 42. When the beam 43 is obscured, the relay 312 is activated, causing its associated contacts to close and complete the circuit including the solenoid associated with the electrically controlled up valve 218. The computer may also send a signal to relay 314, closing its contacts and completing a different circuit including the same solenoid associated with valve 218. This computer signal is generated after the vehicle on the conveyor has passed the boom assembly 20 and the boom 20 is raised to be out of the way of subsequent vehicles passing through the facility.

Photoelectric unit 318 comprises the emitter 45 and detector 44. When the beam 46 is obscured, the contacts on relay 320 close, completing the circuits including the solenoids associated with both of valves 224 and 240. The result is that the pressurized air normally flowing to the top of cylinder 32 through valve 238 is blocked, and air escaping from the bottom of cylinder 32 through valve 224 is also blocked and the boom stays in a static position. If while in this condition, the beam 43 is obscured, valve 218 will open and pressurized air will enter the bottom of the cylinder 32, raising the boom 20 and forcing air out the top of the cylinder 32 to exhaust through valve 242.

Photoelectric unit 324 comprises emitter 47 and detector 48. If beam 49 is obscured, the contacts on relay 322 are closed, having the exact same effect as if the contacts on relay 320 close.

If none of the beams 43, 46 and 49 are obscured, the contacts of relays 312, 320 and 322 remain open and the valves 218, 224 and 240 remain in the position shown in FIG. 11, resulting in the boom being lowered, unless the computer closes the contacts of relay 314 or the safety valve 52 is opened, either event resulting in the boom 20 being raised.

To summarize, the photoelectric assembly 40 detects the elevation profile or contour of the vehicle to be washed, rinsed or waxed by the automatic vehicle washing apparatus. In turn, a control system translates the signals from the detectors into controls for the drive mechanism 30 to move the carriage 18 up and down on the support column 12 or hold it in a static position. Of course, this movement of the carriage 18 causes movement of the boom assembly 20 up, down or stable relative to the contour of the vehicle. This control system interfaces with the car wash facility computer, which directs the overall movement of vehicles through the facility and the application of fluid to each vehicle. The following provides a discussion of how the elements of the device interact in operation.

Prior to any vehicles being washed, rinsed, or waxed, the boom wash assembly 20 is held in the up position by a command of a computer closing the contacts of relay 314. This up position is the limit allowed by contact between the bumper 17 and carriage upper plate 15. In this position the boom 20 is out of the way and vehicles not receiving the treatment provided by the particular device can pass under the boom 20 without any contact with the boom 20. When a vehicle is approaching the invention to be washed, rinsed or waxed, the computer signals the relay 314 to open its contacts and the boom wash assembly 20 descends to position "A" as shown in FIG. 9, as established by the bumper 11 and carriage lower plate 13.

As a vehicle reaches a set position on the conveyor, signals from the computer initiate the flow of fluid through actuator 248 and activate valve 246 to control pressurized air to flow to actuator 248 so that fluid passing therethrough will be dispensed on the front of the vehicle. The sides of the vehicle are washed by independently controlled floor mounted nozzles, not shown.

Figure 9:
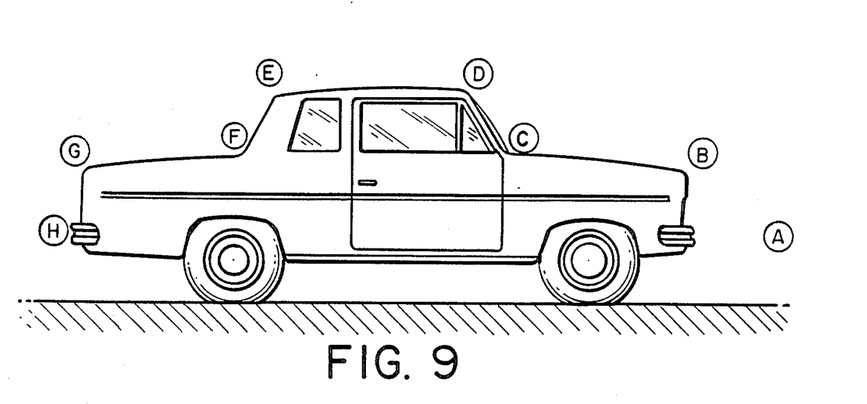
FIG. 9 is a side schematic representation showing the contour of the vehicle depicted in FIG. 1.

As the vehicle moves forward on the conveyor, the front side of the vehicle will block beam 43, closing the contacts on relay 312 and energizing the valve 218, in turn actuating the pneumatic drive means 30 to raise the boom wash assembly 20 vertically upward to position "B" (FIG. 9). After reaching position "B", beam 46 is blocked, but beam 43 is no longer blocked. As a result, the solenoids on valves 224 and 240 are activated to hold the pressure in the cylinder 32 and the boom wash assembly 20 holds its position relative to the vehicle 20, from position "B" to Position "C" (FIG. 9).

At "C", beam 43 is again blocked by the lower part of the windshield on the vehicle, again energizing the solenoid on valve 218, actuating the pneumatic drive means 30 to raise the boom wash assembly 20 vertically upward to position "D" where beam 43 is no longer blocked. Depending on the conveyor speed and the rate of air flow into the bottom of cylinder 32, the up and hold beams may be obscured intermittently during the rise to position "D", thus causing the boom 20 to follow the slanting contour of the windshield.

At "D", because beam 46 is blocked, valve 224 causes the pressure in the cylinder 32 to remain static, and as a result the boom wash assembly 20 will remain at the same elevation from position "D" to position "E". During movement to position E, beam 49 is blocked, and the controls thus hold the boom 20 static even when beam 46 becomes unobscured. After reaching position "E", all of the beams 43, 46 and 49 are unobscured, and as a result valve 23S (FIG. 11) allows pressurized air to enter the top of the cylinder 32 and the boom wash assembly 20 descends to position "F", automatically following the contour of the back window.

After reaching position "F", path 43 is not blocked but path 46 or 49 is blocked, therefore valve 224 holds the pressure in the cylinder 32 in a static condition. As a result, the boom wash assembly 20 remains in its position relative to the vehicle from position "F" to position "G". After reaching position "G", all the beam paths are again unobscured, and the boom wash assembly 20 automatically descends to position "H". After reaching position "H", the boom 20 automatically stays in the lowered position until the computer commands, with a signal to the relay 314 (FIG. 10), to energize the pneumatic drive means 30 to raise the boom wash assembly 20 to an "up" position. The boom 20 stays in this position until the next vehicle is ready to receive the treatment being applied by the particular vehicle washing device, at which time the whole preceding process is repeated.

In the preferred embodiment of the invention, the boom 20 is 104 inches long, the support column and housing combined are 105 inches tall, and the rodless cylinder has a stroke of 66 inches. Rodless cylinders of the type used in the presently preferred embodiment are available from Origa Corporation, 928 N. Oaklawn Ave., Elmhurst, Ill.60126.

The protoelectric units of the preferred embodiment emit and detect modulated light, which allows the units to work accurately in a variety of ambient light conditions. Presently preferred are models BP 400 and LH 400 from Banner Engineering Corporation, P.0. Box 9414, Minneapolis, MN 55440.

It has been found that three pairs of photoelectric units are preferable. Under some circumstances, two pairs would be sufficient, one pair controlling up movements, the other controlling hold movements, and the combination of both controlling down movements. If only two beams are used, the hold beam must be placed at an angle to the vertical plane containing the ends of the boom so that it will hold the boom 20 long enough for a vehicle to completely pass underneath the boom.

The preferred third pair is used when variable conveyor speeds are encountered, and works to prevent the boom assembly from "porpoising" up and down. Porpoising results when the up beam 43 becomes unobscured before the hold beam 49 is obscured. With variable conveyor speeds, it is not always possible to use one hold beam to prevent porpoising while at the same time causing the boom assembly 20 to closely follow the vehicle's contour. One method of preventing porpoising is to place the additional hold beam 46 quite closely to the up beam 43 (almost vertically beneath and at the same angle). Thus the need for two hold beams, hold beam 49 being spaced further behind the up beam 43 to prevent the boom 20 from coming down while still over the vehicle. With two hold beams, if either of the beams 46 or 49 is obscured, the device will stay in a static position, and both must be unobscured before the boom 20 will go down.

In the preferred embodiment, the angles between the beam paths and the horizontal and vertical planes are as follows:

| Angle Number (FIGS. 7 and 8) | |
| --- | --- |
| 83 | 13.5° |
| 86 | 14.3° |
| 89 | 6.6° |
| 93 | 4.0° |
| 96 | 7.6° |
| 99 | 3.9° |

It has been found that if these preferred angles are used when the vehicle washing apparatus is first installed, very little alteration is required to make the resulting system accurately follow the contour of vehicles of a wide variety of shapes and sizes, including midget cars, vans, trucks, etc. After the vehicle washing device has been installed, slight variations may be required to achieve optimum results in terms of accurately following the variety of vehicle contours actually washed at the facility.

The angularity of the beam paths makes it possible for two or three pairs of photoelectric units to detect accurately the contour of different sized and shaped vehicles. If a beam path were horizontal, for example, it would not be able to detect both large and small cars at the bumper from its single preset position when the boom is lowered to position "A" in FIG. 9. With the beam path at an angle to the horizontal plane, however, the photoelectric units will first detect cars at their bumper whether the bumper is high or low. The hold beams 46 and 49 benefit from an angle to the horizontal plane because they then intersect the roof of vehicles instead of passing through its windows, which would give a false signal to lower the boom.

Similar benefits are achieved by having the beams set at angles to the vertical plane containing the ends of the boom, primarily the hold controlling beams 46 and 49. An angular beam has an effective path wider than a beam parallel to the boom. The photoelectric assembly thus acts as if the vehicle were longer than it actually is, keeping the boom at a slight horizontal distance in front and behind the actual vehicle dimensions when the boom raises and lowers. It is preferable to have the up controlling beam 43 set at an angle to the vertical plane for the same reason. If, however, beam 43 is made parallel to the vertical plane, proper adjustment must made so that beam 43 is a proper distance from the boom assembly 20 to raise the boom 20 at the proper distance from the vehicle, about one foot in the preferred embodiment.

Different angles than those in the preferred embodiment may also be used. The maximum angle is limited by the size of the supporting structure. Beyond angles of 45°, the support structure would have to accommodate vertical and horizontal displacements between the elements of the photoelectric pairs greater than the length of the boom. The minimum angle with the horizontal plane that will be useful depends on the variety of vehicle sizes, but will normally be at least 2°. The minimum angle with the vertical plane depends on the variety of vehicles and conveyor speeds for which the vehicle washing apparatus is to be used, and likewise will normally be at least 2°.

If the conveyor speed is kept uniform, and two "hold" beams are used, angles between the beams and the verticle plane are not critical because the rate at which the boom rises and falls can be factored into the distance the beams are spaced from the boom. Most automatic car washes, however, use a variety of conveyor speeds so that the equipment can respond to such variables as the dirtyness of the vehicle, the number of vehicles waiting to be washed, the time it takes to complete manual functions such as window cleaning, etc. Thus the preferred embodiment has the beams at angles with the vertical plane to provide greater safety margins for boom movement. This angularity of the beams also makes it possible for the beams to catch narrow irregularities in the vehicles contour, such as spoilers on the back of a car, which might be missed if the hold beams were parallel to the vertical plane yet spaced far enough apart to hold and lower the boom at the desired distance in front of and behind vehicles being washed.

The approximate preferred vertical and horizontal distances (in inches) between the centerline of the boom and the various emitters and detectors are as follows:

| Element | Horizontal Distance (FIG. 7) | Vertical Distance (FIG. 8) |
| --- | --- | --- |
| 41 | 35 | 12 |
| 42 | 10 | 5 |
| 44 | 34 | 22 |
| 45 | 6 | 8 |
| 47 | 7 | 11 |
| 48 | 6 | 19 |

These distances are important to keep the boom 20 from getting closer than about 10 inches from the vehicle. These preferred spacings are also important to avoid having the spray from the nozzles 26 interfere with the beams. Of course if different nozzle configurations are used, other distances might be most preferred.

The nozzles 26 in the preferred embodiment are stainless steel, and are designed to deliver fluid at a pressure of 1000 psi. Due to the high pressure of the fluid spray, it is preferable to maintain the boom about one foot from the vehicle. Having the nozzles too close to the vehicle produces "stripes" where their spray does not reach or overlap. On the other hand, the spray from the nozzles 26 is less efficient the greater the distance between the nozzle and the vehicle.

The magnet 28 is designed to be strong enough to just counteract the reactive forces generated when the nozzles 26 are spraying in the rear facing direction. This is about 450 pounds in the preferred embodiment. The result is that only very slight additional pressure on the boom 20 will cause the magnet 28 to release plate 27, allowing the boom 20 to swing clear of an oncoming vehicle.

The counterweight 37 serves two positive functions. First, it helps to balance the weight of the boom assembly 20, reducing the force that must be generated by the pneumatic cylinder 32 to raise the boom 20. Second, it adds mass to the drive mechanism, thus helping to dampen any erratic movements caused by fluctuations in the air pressure.

As previously mentioned, one of the advantages of the present invention is its very simple drive structure. Because the boom is cantileverly supported, the up and down drive forces need be generated and applied to only one end of the boom 20. The cantilever structure also allows for the safety break-away procedure using magnet 28.

Another important advantage of the presently preferred embodiment is its compactness. In car wash facilities, floor space is at a premium. The preferred embodiment takes only about 40 square feet of floor space for its operation.

Another advantage of the preferred embodiment of the invention is that if the electrical system fails, the safety valve 52 and fast up valve 220 operate completely pneumatically and will raise the boom. Another advantage of the preferred arrangement is that if the boom 20 breaks away from its magnetic connections, the beams are all misdirected and the boom 20 will rise as if beam 43 were obscrued.

Another advantage of the preferred embodiment is that cross-talk between closely spaced detectors, such as those depicted in the Alimanestiano and Gibson patents, is eliminated.

While the invention has been described with respect to its preferred embodiments, it will be understood that the invention is capable of numerous rearrangements, modifications and alterations. For example, the device has been described in terms of a car washing, rinsing or waxing apparatus. It could also be used for washing other vehicles such as large trucks, etc., or for applying fluids such as paint to conveyored objects where contour following is advantageous. The preferred embodiment of the photoelectric units uses modulated electromagnetic radiation, but equivalent devices such as lasers would also work. The means to detect the relative position of the boom assembly and the contour of the vehicle could include sonar devices, television silhouette scanning, etc. Therefore, all such arrangements, modifications and alterations are intended to be within the scope of the appended claims.

I claim:

1. An apparatus for applying fluids on a vehicle comprising:
   (a) a support column;
   (b) a carriage slidably mounted on said support column;
   (c) drive means attached to said carriage to provide a driving force to move said carriage up and down on said support column;
   (d) a boom assembly cantileverly supported on said carriage by a hinge connection allowing the boom to pivot about the support column in a substantially horizontal plane;
   (e) a magnet assembly interconnected between said boom and said support column which prevents the boom from pivoting about said support column under normal operating conditions unless the boom is struck by a vehicle;
   (f) a plurality of fluid dispensing nozzles mounted on said boom assembly;
   (g) a plurality of pairs of photoelectric units, each pair comprising an emitter element and a detector element, mounted on said boom assembly such that
      (i) one element of each pair is mounted at opposite ends of the boom asembly and
      (ii) a straight line between the elements of each pair forms an angle with the generally horizontal plane containing the direction of relative movement between the vehicle and the apparatus; and
   (h) control means for activating said drive means incluiding:
      (i) means for raising said boom assembly when the path between a first one of said pairs of photoelectric units is obscured,
      (ii) means for lowering said boom assembly when none of the paths between said pairs of photoelectric units are obscured and
      (iii) means for holding said boom in its existing position when the path between said first pair of photoelectric units is not obscured but the path between one or more of the other of said pairs of photoelectric units is obscured.

2. The apparatus of claim 1 wherein the plurality of pairs comprises three pairs.

3. The apparatus of claim 2 wherein the angle between said pairs and said horizontal plane are between 2° and 45°.

4. The apparatus of claim 1 wherein:
   (a) the elements of said first one of said pairs of photoelectric units are positioned such that a vehicle moving towards the boom assembly will obscure a beam of light passing between the elements when said vehicle is closer than about 10 inches from the boom assembly.

5. The apparatus of claim 1 wherein the photoelectric units emit and detect modulated electromagnetic radiation.

6. The apparatus of claim 1 wherein the straight line between the elements of each pair also forms an angle with the vertical plane containing the ends of the boom.

7. The apparatus of claim 6, wherein the angles formed between said straight lines and said vertical plane are between 2° and 45° and wherein the angles formed between said straing lines and said horizontal plane are between 2° and 45°.

8. The apparatus of claim 6 wherein the plurality of pairs of photoelectric units comprises a first pair, a second pair and a third pair, and
   (a) the straight line between the elements of said first pair of photoelectric units is at angles of about 13° with said vertical plane and about 4° with said horizontal plane;
   (b) the straight line between the elements of said second pair of photoelectric units is at angles of about 14° with said vertical plane and about 8° with said horizontal plane and
   (c) the straight line between the elements of said third pair of photoelectric units is at angles of about 7° with said vertical plane and about 4° with said horizontal plane.

9. The apparatus of claim 6 wherein said plurality of pairs comprises only two pairs.

10. An apparatus for applying fluids on a vehicle comprising:
    (a) a boom assembly cantileverly supported on a support column, hinged to pivot about said support column in a substantially horizontal plane and mounted to move up and down on said support column, said boom assembly comprising:
       (i) means for dispensing fluid on said vehicle and
       (ii) means for detecting the relative position between the boom assembly and the contour of the vehicle;
    (b) a magnet assembly interconnecting said boom assembly and said support column having sufficient magnetic force to prevent said boom from pivoting relative to said support column during normal operation of the apparatus, said magnetic force being weak enough to also allow said boom to pivot in response to contact between said boom and the vehicle;
    (c) drive means attached to said boom for raising and lowering said boom, said drive means comprising a rodless pneumatic cylinder; and (d) control means connected to said drive means and said detecting means to cause said boom to remain slightly above and follow the contour of said vehicle during relative horizontal movement between said vehicle and the appartus.

11. The apparatus of claim 10 wherein the dispensing means comprises a plurality of nozzles connected to a high pressure source of fluid.

12. The apparatus of claim 11 wherein a portion of the plurality of nozzles are rearwardly directed and a portion are forwardly directed.

13. The apparatus of claim 10 wherein the boom assembly further comprises a safety device for causing the drive means to raise said boom in the event of contact between the vehicle and the safety device.

14. The apparatus of claim 13 wherein the safety device comprises a wand of a shape and mounted on the boom assembly such that contact on either the bottom of the wand or the side of the wand facing an oncoming vehicle cause the drive means to raise said boom.

15. The apparatus of claim 10 further comprising a pulley supported near the top of said support column and a counterweight suspended by a cable draped over said pulley and attached to said carriage.

16. The apparatus of claim 15 wherein the support column is hollow and said counterweight is suspended inside said column.

* * * * *

UNITED STATES PATENT AND TRADEMARK OFFICE
CERTIFICATE OF CORRECTION

PATENT NO. : 4,719,932
DATED : January 19, 1988
INVENTOR(S) : Forrest R. Burton

Page 1 of 3

It is certified that error appears in the above-identified patent and that said Letters Patent is hereby corrected as shown below:

IN THE BACKGROUND OF THE INVENTION

In column 1, line 34, please delete "cause" and substitute therefor --causes--.

IN THE DETAILED DESCRIPTION OF THE DRAWINGS AND PREFERRED EMBODIMENT OF THE INVENTION

In column 4, line 47, please delete "2S" and substitute therefor --28--.

In column 5, line 55, please delete "angels" and substitute therefor --angles--.

In column 5, line 55, please delete the second occurrence of "the".

In column 6, line 58, please delete "S2" and substitute therefor --82--.

In column 6, line 59, please delete "S2" and substitute therefor --82--.

In column 7, line 46, please delete "an" and substitute therefor --a--.

In column 8, line 9, please delete "quickely" and substitute therefor --quickly--.

In column 9, line 50, please delete "Position" and substitute therefor --position--.

UNITED STATES PATENT AND TRADEMARK OFFICE
CERTIFICATE OF CORRECTION

PATENT NO. : 4,719,932

DATED : January 19, 1988

INVENTOR(S) : Forrest R. Burton

It is certified that error appears in the above-identified patent and that said Letters Patent is hereby corrected as shown below:

In column 9, line 65, please delete "E," and substitute therefor --"E,"--.

In column 10, line 1, please delete "23S" and substitute therefor --238--.

In column 11, line 66, please delete "verticle" and substitute therefor --vertical--.

In column 12, line 10, please delete "vehicles" and substitute therefor --vehicle's--.

In column 12, line 39, please delete "nozzels" and substitute therefor --nozzles--.

In column 13, line 10, please delete "obscrued" and substitute therefor --obscured--.

UNITED STATES PATENT AND TRADEMARK OFFICE
CERTIFICATE OF CORRECTION

PATENT NO. : 4,719,932
DATED : January 19, 1988
INVENTOR(S) : Forrest R. Burton

It is certified that error appears in the above-identified patent and that said Letters Patent is hereby corrected as shown below:

IN THE CLAIMS

In column 13, line 62, please delete "incluiding" and substitute therefor --including--.

In column 14, line 28, please delete "straing" and substitute therefor --straight--.

Signed and Sealed this

Twenty-fifth Day of July, 1989

Attest:

DONALD J. QUIGG

Attesting Officer

Commissioner of Patents and Trademarks